United States Patent
Lee et al.

(10) Patent No.: US 11,312,885 B2
(45) Date of Patent: Apr. 26, 2022

(54) ADHESIVE FILM, OPTICAL MEMBER COMPRISING SAME, AND OPTICAL DISPLAY APPARATUS COMPRISING SAME

(71) Applicant: SAMSUNG SDI CO., LTD., Yongin-si (KR)

(72) Inventors: Seung Jun Lee, Suwon-si (KR); Woo Jin Jeong, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 454 days.

(21) Appl. No.: 16/313,430

(22) PCT Filed: Dec. 23, 2016

(86) PCT No.: PCT/KR2016/015166
§ 371 (c)(1),
(2) Date: Dec. 26, 2018

(87) PCT Pub. No.: WO2018/004091
PCT Pub. Date: Jan. 4, 2018

(65) Prior Publication Data
US 2019/0225845 A1    Jul. 25, 2019

(30) Foreign Application Priority Data

Jun. 27, 2016 (KR) .................. 10-2016-0080486

(51) Int. Cl.
*C09J 133/10* (2006.01)
*G02B 5/30* (2006.01)
(Continued)

(52) U.S. Cl.
CPC .......... *C09J 133/10* (2013.01); *C09J 133/08* (2013.01); *G02B 1/14* (2015.01); *G02B 5/30* (2013.01);
(Continued)

(58) Field of Classification Search
CPC .. C09J 133/08; C09J 133/10; C09J 2203/318; C09J 7/255; C09J 2301/208;
(Continued)

(56) References Cited

U.S. PATENT DOCUMENTS

2006/0251907 A1* 11/2006 Shimizu .................. H01L 24/32
                                                                428/447
2010/0316872 A1* 12/2010 Takamatsu ................. C09J 5/06
                                                                428/354
(Continued)

FOREIGN PATENT DOCUMENTS

CN            1884412 A      12/2006
CN          102859403 A       1/2013
(Continued)

OTHER PUBLICATIONS

Chinese Office Action dated Apr. 21, 2020 from corresponding Chinese Patent Application No. 201680087190.2 (7 pgs.).

*Primary Examiner* — Sophie Hon
(74) *Attorney, Agent, or Firm* — Lewis Roca Rothgerber Christie LLP (57) ABSTRACT

Provided are an adhesive film, an optical member including the same, and an optical display apparatus including the same, the adhesive film including two or more (meth)acrylic adhesive layers including a first (meth)acrylic adhesive layer and a second (meth)acrylic adhesive layer, and having Young's modulus of approximately 100-1000 MPa and peel strength of approximately 1.0 N/mm or higher at the second (meth)acrylic adhesive layer.

19 Claims, 2 Drawing Sheets

(51) Int. Cl.
*G02B 1/14* (2015.01)
*C09J 133/08* (2006.01)

(52) U.S. Cl.
CPC ... *C09J 2203/318* (2013.01); *C09K 2323/035* (2020.08)

(58) Field of Classification Search
CPC ........ C09J 2301/312; G02B 1/14; G02B 5/30; G02B 5/3025; C09K 2323/035
See application file for complete search history.

(56) References Cited

U.S. PATENT DOCUMENTS

| | | | | |
|---|---|---|---|---|
| 2011/0251351 | A1* | 10/2011 | Inokuchi | C09J 133/00 525/221 |
| 2011/0293871 | A1* | 12/2011 | Storfer-Isser | B32B 27/32 428/41.8 |
| 2012/0314160 | A1* | 12/2012 | Hwang | G02B 5/305 349/96 |
| 2014/0300965 | A1* | 10/2014 | Takeda | G02B 1/105 359/513 |
| 2014/0377551 | A1* | 12/2014 | Kataoka | C09J 171/02 428/354 |

FOREIGN PATENT DOCUMENTS

| | | |
|---|---|---|
| JP | 2001-138466 A | 5/2001 |
| JP | 2009-227891 A | 10/2009 |
| JP | 2011-219665 A | 11/2011 |
| KR | 10-2004-0018147 A | 3/2004 |
| KR | 10-2015-0111864 A | 10/2015 |
| KR | 10-2016-0053788 A | 5/2016 |
| KR | 101943705 B1 * | 1/2019 ............... G02B 1/14 |

* cited by examiner

ADHESIVE FILM, OPTICAL MEMBER COMPRISING SAME, AND OPTICAL DISPLAY APPARATUS COMPRISING SAME

CROSS-REFERENCE TO RELATED APPLICATIONS

This application is a National Phase Patent Application and claims priority to and the benefit of International Application Number PCT/KR2016/015166, filed on Dec. 23, 2016, which claims priority to and the benefit of Korean Patent Application No. 10-2016-0080486, filed on Jun. 27, 2016, the entire contents of each of which are incorporated herein by reference.

FIELD

The present invention relates to an adhesive film, an optical member including the same, and an optical display including the same.

BACKGROUND

An optical display includes optical elements including a window film, a polarizing film, an optical film, a transparent electrode film, and the like. The optical elements may be stacked inside the optical display by adhesive films. Accordingly, the adhesive film is required to have high peel strength with respect to various types of optical elements. Among these optical elements, the window film is disposed at the outermost side of the optical display. Thus, the window film of the optical display is required to have high pencil hardness. However, upon mounting the window film on an optical element via the adhesive film, pencil hardness of the window film can be decreased.

Recently, a flexible display capable of being folded or unfolded has been developed by replacing a glass substrate or a high hardness substrate in a display in the art. Not only a substrate but also various elements included in the flexible display are required to have flexibility. In addition, adhesive films for attaching various elements to each other are also required to have flexibility. In addition, the adhesive films are required to secure bendability while preventing the elements attached to each other thereby to be bent without being peeled off.

On the other hand, an adhesive film composed of multiple adhesive layers having different properties has an advantage of realizing a plurality of properties. However, the adhesive layers constituting the adhesive film have different properties and/or materials, thereby causing deterioration in reliability through deterioration in adhesion therebetween and occurrence of bubbles, slight lifting, or delamination under high temperature and/or high humidity conditions. Particularly, when the adhesive films are applied to a flexible display, the adhesive films are bent plural times during operation of the flexible display, thereby causing deterioration in reliability and severe interfacial delamination.

The background technique of the present invention is disclosed in Japanese Unexamined Patent Publication No. 2001-138466.

SUMMARY

It is an aspect of the present invention to provide an adhesive film that can minimize deterioration in pencil hardness upon stacking of optical elements.

It is another aspect of the present invention to provide an adhesive film that can secure a pencil hardness of HB or higher upon stacking of optical elements.

It is a further aspect of the present invention to provide an adhesive film that can minimize suppress deterioration in pencil hardness while exhibiting high peel strength to provide good adhesive strength upon stacking of optical elements.

It is yet another aspect of the present invention to provide an adhesive film that can secure improvement in impact resistance upon stacking of optical elements.

It is yet another aspect of the present invention to provide an adhesive film that can secure good bendability and reliability by preventing bubble generation, slight lifting, and detachment between adhesive layers.

In accordance with one aspect of the present invention, an adhesive film includes at least two (meth)acrylic adhesive layers including a first (meth)acrylic adhesive layer and a second (meth)acrylic adhesive layer and has a Young's modulus of about 100 MPa to about 1,000 MPa, wherein the second (meth)acrylic adhesive layer has a peel strength of about 1.0 N/mm or more with respect to a polyethylene terephthalate (PET) film.

In accordance with another aspect of the present invention, an adhesive film includes multiple (meth)acrylic adhesive layers in which a second (meth)acrylic adhesive layer, a first (meth)acrylic adhesive layer and a third (meth)acrylic adhesive layer are sequentially formed one above another, and may have a Young's modulus of about 100 MPa to about 1000 MPa, wherein the second (meth)acrylic adhesive layer or the third (meth)acrylic adhesive layer has a peel strength of about 1.0 N/mm or more with respect to a polyethylene terephthalate (PET) film.

In accordance with a further aspect of the present invention, an optical member may include an optical element and an adhesive film formed on at least one surface of the optical element, wherein the adhesive film includes the adhesive film according to the present invention as set forth above.

In accordance with yet another aspect of the present invention, an optical display includes the adhesive film according to the present invention as set forth above.

The present invention provides an adhesive film that can minimize deterioration in pencil hardness upon stacking of optical elements.

The present invention provides an adhesive film that can secure a pencil hardness of HB or higher upon stacking of optical elements.

The present invention provides an adhesive film that can minimize suppress deterioration in pencil hardness while exhibiting high peel strength to provide good adhesive strength upon stacking of optical elements.

The present invention provides an adhesive film that can secure improvement in impact resistance upon stacking of optical elements.

The present invention provides an adhesive film that can secure good bendability and reliability by preventing bubble generation, slight lifting, and detachment between adhesive layers.

DETAILED DESCRIPTION

Hereinafter, embodiments of the present invention will be described with reference to the accompanying drawings. It should be understood that the present invention is not limited to the following embodiments and may be embodied in different ways. Further, it should be understood that the embodiments are provided for complete disclosure and thorough understanding of the present invention by those skilled in the art. In the drawings, thicknesses or widths of various components of each device may be exaggerated for convenience. Like components will be denoted by like reference numerals throughout accompanying drawings.

As used herein, spatially relative terms such as "upper" and "lower" are defined with reference to the accompanying drawings. Thus, it will be understood that "upper" can be used interchangeably with "lower". It will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

Herein, the term "(meth)acryl" refers to acryl and/or methacryl.

Herein, unless otherwise stated, "substituted" in "unsubstituted or substituted" means that at least one hydrogen atom in a functional group is substituted with a $C_1$ to $C_{10}$ alkyl group, an amino group, a $C_6$ to $C_{10}$ aryl group, a halogen, a cyano group, a $C_3$ to $C_{10}$ cycloalkyl group, or a $C_7$ to $C_{10}$ arylalkyl group.

Herein, "Young's modulus" of an adhesive film is measured at 25° C. in accordance with ASTM D882.

Herein, "pencil hardness of an optical element on an adhesive film" is measured in accordance with ASTM D3360. In measurement of pencil hardness, a stacked structure of the adhesive film and the optical element is disposed on a substrate (for example, a glass plate, a stainless steel plate, or the like) such that the optical element is placed at the outermost side, and pencil hardness of the optical element is measured using a pencil hardness tester (CORE TECH, total solution for laboratory). For measurement of pencil hardness, pencils of H to 9H, F, HB, and B to 6B (Mitsubishi Co., Ltd.) were used. Specifically, pencil hardness was measured under conditions of a scratch angle (angle between the pencil and the optical element) of 45°, a scratch speed of 0.5 mm/sec and a pencil scale of 5.0 mm under a load of 250 g. When the optical element has one or more scratches after being tested 5 times using a certain pencil, pencil hardness is measured again using another pencil having one-level lower pencil hardness than the previous pencil, and the maximum value of pencil hardness allowing no scratch to be observed all five times on the optical element is taken as pencil hardness of the optical element.

Herein, "pencil hardness of an optical element" is measured in accordance with ASTM D3360 and is the same as the "pencil hardness of an optical element on an adhesive film" except that pencil hardness is measured on the optical element without the adhesive film.

Herein, "peel strength" is measured at 25° C. in accordance with ASTM D3330.

Figure 1:
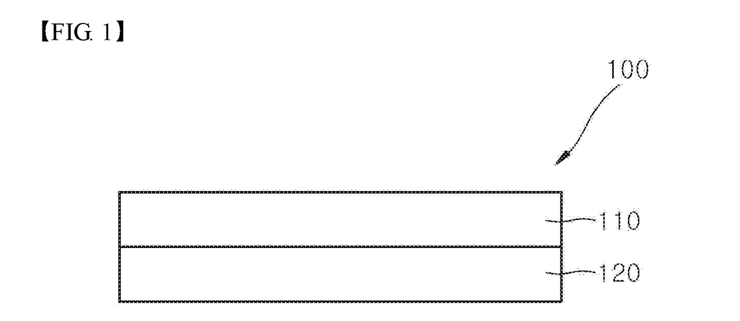
FIG. 1 is a sectional view of an adhesive film according to one embodiment of the present invention.

Hereinafter, an adhesive film according to one embodiment of the present invention will be described with reference to FIG. 1. FIG. 1 is a sectional view of an adhesive film according to one embodiment of the present invention.

Referring to FIG. 1, an adhesive film 100 according to one embodiment of the present invention may include a first (meth)acrylic adhesive layer 110 and a second (meth)acrylic adhesive layer 120.

The adhesive film 100 may have a Young's modulus of about 100 MPa to about 1,000 MPa. Thus, when an optical element is stacked on at least one surface of the adhesive film 100, the optical element on the adhesive film 100 may have a pencil hardness of about HB or higher, specifically about HB to about 9H. Within this range of pencil hardness, a stack of the adhesive film and the optical element can have high pencil hardness to be sufficiently used in an optical display. The adhesive film 100 is advantageous particularly in stacking of a window film among various optical elements. In addition, the adhesive film 100 can minimize a difference between pencil hardness of the optical element and pencil hardness of the optical element on the adhesive film. Specifically, the adhesive film 100 allows the difference between pencil hardness of the optical element and pencil hardness of the optical element on the adhesive film to be maintained at two levels or less among H to 9H, F, HB, and B to 6B as calculated by Equation 1 after measuring pencil hardness in accordance with ASTM D3360.

$$\text{Difference in pencil hardness} = |A - B|, \qquad \text{<Equation 1>}$$

where A is pencil hardness of the optical element and B is pencil hardness of the optical element on the adhesive film.

Specifically, the adhesive film 100 may have a Young's modulus of about 150 MPa to about 800 MPa, for example, about 150 MPa, about 200 MPa, about 250 MPa, about 300 MPa, about 350 MPa, about 400 MPa, about 450 MPa, about 500 MPa, about 550 MPa, about 600 MPa, about 650 MPa, about 700 MPa, about 750 MPa, or about 800 MPa. Within this range of Young's modulus, the adhesive film exhibits good flexibility to allow the stack of the adhesive film and the optical element to be used in a flexible display.

The adhesive film 100 may allow about 100,000 cycles or more of bending, specifically about 100,000 to about 200,000 cycles of bending, without bubble generation, slight lifting, or delamination between the adhesive film and a PET film in a specimen (length×width: 40 mm×60 mm) prepared by sequentially stacking a first PET film (thickness: 100 μm), the adhesive film, and a second PET film (thickness: 100 μm) to have a three-layer structure, as measured in accordance with IEC-62715 by repeating a cycle of bending the specimen under conditions of a bent radius of 5 mm and a bending temperature of 25° C. at a bending speed of 30 cycles per minute. Accordingly, the adhesive film 100 can be sufficiently used in a flexible display.

One surface of the adhesive film 100, for example, the second (meth)acrylic adhesive layer 120 may have a peel strength of about 1.0 N/mm or higher with respect to a polyethylene terephthalate (PET) film, specifically about 1.0 N/mm to about 20 N/mm, more specifically about 1.0 N/mm to about 10 N/mm, for example, about 1.0 N/mm, about 1.5 N/mm, about 2.0 N/mm, about 2.5 N/mm, about 3.0 N/mm, about 3.5 N/mm, about 4.0 N/mm, about 4.5 N/mm, about 5.0 N/mm, about 5.5 N/mm, about 6.0 N/mm, about 6.5 N/mm, about 7.0 N/mm, about 7.5 N/mm, about 8.0 N/mm, about 8.5 N/mm, about 9.0 N/mm, about 9.5 N/mm, or about 10.0 N/mm. Within this range, the adhesive film can sufficiently attach the optical element to another optical element without deterioration in reliability.

The adhesive film 100 exhibits good transparency in the visible range (for example: in a wavelength range of 380 nm to 780 nm) and may have a total light transmittance of about 80% or higher, specifically about 80% to about 100%. Within this range, the adhesive film has good transparency and can be used in an optical display.

The adhesive film 100 may have a thickness of about 10 μm to about 200 μm, specifically about 20 μm to about 100 μm. Within this range, the adhesive film can be used in a flexible display and can secure good pencil hardness of an optical element on the adhesive film.

The adhesive film 100 includes two or more (meth)acrylic adhesive layers including the first (meth)acrylic adhesive layer 110 and the second (meth)acrylic adhesive layer 120 to have good Young's modulus and peel strength in the above ranges at the same time. The first (meth)acrylic adhesive layer 110 may have a greater Young's modulus than the second (meth)acrylic adhesive layer 120. As a result, the adhesive film 100 can easily secure good Young's modulus and peel strength in the above ranges. In addition, since the first (meth)acrylic adhesive layer 110 and the second (meth)acrylic adhesive layer 120 are homogeneous (meth)acrylic adhesive layers, it is possible to minimize interfacial delamination.

Next, the first (meth)acrylic adhesive layer 110 will be described.

The first (meth)acrylic adhesive layer 110 may be formed on one surface of the second (meth)acrylic adhesive layer 120 to support the adhesive film 100.

The first (meth)acrylic adhesive layer 110 may have higher Young's modulus than the second (meth)acrylic adhesive layer 120. Accordingly, the adhesive film 100 can secure sufficient pencil hardness of the optical element on the adhesive film. Specifically, a ratio of Young's modulus of the first (meth)acrylic adhesive layer to Young's modulus of the second (meth)acrylic adhesive layer (Young's modulus of the first (meth)acrylic adhesive layer/Young's modulus of the second (meth)acrylic adhesive layer) may be about 4 or higher, specifically about 4 to about 11,000. Within this range, the adhesive film can secure pencil hardness of the optical element on the adhesive film and peel strength at the same time.

The first (meth)acrylic adhesive layer 110 may have a Young's modulus of about 800 MPa or higher, specifically about 800 MPa to about 2,000 MPa, for example, about 800 MPa, about 850 MPa, about 900 MPa, about 950 MPa, about 1,000 MPa, about 1,050 MPa, about 1,100 MPa, about 1,1,50 MPa, about 1,200 MPa, about 1,250 MPa, about 1,300 MPa, about 1,350 MPa, about 1,400 MPa, about 1,450 MPa, about 1,500 MPa, about 1,550 MPa, about 1.60 MPa, about 1,650 MPa, about 1,700 MPa, about 1,750 MPa, about 1,800 MPa, about 1,850 MPa, about 1,900 MPa, about 1,950 MPa, or about 2,000 MPa. Within this range, the adhesive film can secure pencil hardness of an optical element on the adhesive film and good reliability. In particular, the first (meth)acrylic adhesive layer 110 may have a Young's modulus of about 900 MPa to about 2,000 MPa. Within this range, both the first (meth)acrylic adhesive layer and the second (meth)acrylic adhesive layer can exhibit good bendability and can be used in a flexible display.

The first (meth)acrylic adhesive layer 110 may have a thickness about 10% to about 90% of the total thickness of the adhesive film 100, specifically about 15% to about 60%, for example, about 15%, about 20%, about 25%, about 30%, about 35%, about 40%, about 45%, about 50%, about 55%, or about 60%. Within this range, the adhesive film can easily secure good pencil hardness of an optical element on the adhesive film in the above range. The first (meth)acrylic adhesive layer 110 may have a thickness of about 1 μm to about 100 μm, specifically about 5 μm to about 45 μm. Within this thickness range, the first (meth)acrylic adhesive layer 110 can be used in the adhesive film and can easily secure good pencil hardness of an optical element on the adhesive film in the above range.

The first (meth)acrylic adhesive layer may be formed of a composition for the first (meth)acrylic adhesive layer. Hereinafter, the composition for the first (meth)acrylic adhesive layer will be described. The composition for the first (meth)acrylic adhesive layer includes a (meth)acrylic resin and a curing agent.

The (meth)acrylic resin may have a weight average molecular weight of about 1,000,000 or less, specifically about 200,000 to about 1,000,000, and a glass transition temperature of about 25° C. to about 120° C., for example, about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., or about 120° C. Within these ranges, the adhesive film has high Young's modulus to increase pencil hardness. The weight average molecular weight may be measured by gel permeation chromatography using a polystyrene standard.

The (meth)acrylic resin may include a (meth)acrylic copolymer of a monomer mixture including an alkyl group-containing (meth)acrylic monomer and a hydroxyl group-containing (meth)acrylic monomer. The monomer mixture may include at least one of an unsubstituted or substituted $C_1$ to $C_{20}$ alkyl group-containing (meth)acrylic monomer, a hydroxyl group-containing (meth)acrylic monomer, an unsubstituted or substituted $C_3$ to $C_{20}$ cycloalkyl group-containing (meth)acrylic monomer, and an unsubstituted or substituted $C_6$ to $C_{20}$ aromatic group-containing (meth)acrylic monomer. These may be used alone or as a mixture thereof.

The unsubstituted or substituted $C_1$ to $C_{20}$ alkyl group-containing (meth)acrylic monomer may include a $C_1$ to $C_{20}$ alkyl group-containing (meth)acrylic acid ester. For example, the $C_1$ to $C_{20}$ alkyl group-containing (meth)acrylic acid ester may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto.

The unsubstituted or substituted $C_3$ to $C_{20}$ cycloalkyl group-containing (meth)acrylic monomer may include a $C_3$ to $C_{20}$ cycloalkyl group-containing (meth)acrylic acid ester, in which the $C_3$ to $C_{20}$ cycloalkyl group may be substituted or unsubstituted. For example, the (meth)acrylic acid ester having a $C_3$ to $C_{20}$ cycloalkyl group may include at least one of cyclopentyl (meth)acrylate, cyclohexyl (meth)acrylate, and isobornyl (meth)acrylate.

The unsubstituted or substituted $C_6$ to $C_{20}$ aromatic group-containing (meth)acrylic monomer may include a $C_6$ to $C_{20}$ aromatic group-containing (meth)acrylic acid ester, in which the $C_6$ to $C_{20}$ aromatic group may be substituted or unsubstituted. For example, the $C_6$ to $C_{20}$ aromatic group-containing (meth)acrylic acid ester may include at least one of phenyl (meth)acrylate and benzyl (meth)acrylate.

The hydroxyl group-containing (meth)acrylic monomer may include at least one of a $C_1$ to $C_{20}$ alkyl group-containing (meth)acrylic monomer having a hydroxyl group, a $C_3$ to $C_{20}$ cycloalkyl group-containing (meth)acrylic monomer having a hydroxyl group, and a $C_6$ to $C_{20}$ aromatic group-containing (meth)acrylic monomer having a hydroxyl group. Specifically, the hydroxyl group-containing (meth)acrylic monomer may include at least one of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexane dimethanol mono(meth)acrylate, 1-chloro-2-hydroxypropyl (meth)acrylate, diethylene glycol mono(meth)acrylate, 2-hydroxy-3-phenyloxypropyl (meth)acrylate, 4-hydroxycyclopentyl (meth)acrylate, and 4-hydroxycyclohexyl (meth)acrylate. These may be used alone or as a mixture thereof.

The (meth)acrylic resin may be prepared by a typical polymerization method. The polymerization method may include a typical method known to those skilled in the art. For example, the (meth)acrylic copolymer may be prepared by a typical copolymer polymerization method, for example, suspension polymerization, emulsion polymerization, solution polymerization, and the like, after adding an initiator to the monomer mixture. Polymerization may be performed at a temperature of about 65° C. to about 70° C. for about 6 hours to about 8 hours. The initiator may be a typical initiator including an azo-based polymerization initiator and/or a peroxide polymerization initiator such as benzoyl peroxide or acetyl peroxide.

The curing agent may include a polyisocyanate-based curing agent modified with an allophanate group, thereby preventing cracking and detachment upon bending. For example, the isocyanate-based curing agent may be an aliphatic polyisocyanate modified with an allophanate group. The aliphatic polyisocyanate-based curing agent is a $C_4$ to $C_{20}$ diisocyanate and may include tetramethylene diisocyanate, hexamethylene diisocyanate, dodecamethylene diisocyanate, trimethylhexamethylene diisocyanate including 2,2,4-trimethylhexamethylene diisocyanate, and the like. The polyisocyanate-based curing agent modified with an allophanate group may be obtained from commercially available products.

The curing agent may be present in an amount of about 15 parts by weight to about 70 parts by weight relative to 100 parts by weight of the (meth)acrylic resin, for example, about 15 parts by weight, about 20 parts by weight, about 25 parts by weight, about 30 parts by weight, about 35 parts by weight, about 40 parts by weight, about 45 parts by weight, about 50 parts by weight, about 55 parts by weight, about 60 parts by weight, about 65 parts by weight, or about 70 parts by weight. Within this range of the curing agent, the composition can secure modulus of an adhesive layer.

The adhesive composition may further include at least one of a silane coupling agent and a crosslinking catalyst.

The silane coupling agent can improve peel strength of the first (meth)acrylic adhesive layer. The silane coupling agent may include an epoxy group-containing silane coupling agent, such as glycidoxypropyltrimethoxysilane, glycidoxypropylmethyldimethoxysilane, and the like. The silane coupling agent may be present in an amount of about 0.1 parts by weight to about 5 parts by weight relative to 100 parts by weight of the (meth)acrylic resin. Within this range, the adhesive composition can exhibit improved adhesive strength. The crosslinking catalyst serves to improve the degree of crosslinking of an adhesive layer formed of the adhesive composition. The crosslinking catalyst may include at least one of a metal and a metal-containing compound. Specifically, the crosslinking catalyst may include at least one of a tin-containing compound, a zinc-containing compound, a titanium compound, and a bismuth compound. More specifically, the crosslinking catalyst may include one of dilaurate and tin dimaleate. The crosslinking catalyst may be present in an amount of about 0.01 parts by weight to about 1.5 parts by weight relative to 100 parts by weight of the (meth)acrylic resin. Within this range, the adhesive composition can exhibit improvement in the degree of crosslinking and can suppress moisture penetration.

Although the composition for the first (meth)acrylic adhesive layer is a solvent-free composition in this embodiment, it should be understood that the composition may further include a solvent to improve coatability, paintability or processability. The solvent may include methylethylketone, methylisobutylketone, and propylene glycol monomethyl ether acetate, without being limited thereto.

The composition for the first (meth)acrylic adhesive layer may further include additives. The additives serve to provide additional functionality to the adhesive layer. Specifically, the additives may include at least one selected from among UV absorbents, reaction inhibitors, adhesion improvers, thixotropic agents, conductivity-imparting agents, color-adjusting agents, stabilizers, antistatic agents, antioxidants, and leveling agents, without being limited thereto.

The composition for the first (meth)acrylic adhesive layer may have a viscosity at 25° C. of about 5 cP to about 200 cP, specifically about 10 cP to about 150 cP. Within this range of viscosity, the composition can easily form the first (meth)acrylic adhesive layer.

Next, the second (meth)acrylic adhesive layer will be described.

The second (meth)acrylic adhesive layer 120 may be formed on one surface of the first (meth)acrylic adhesive layer 110 to provide peel strength to the adhesive film 100.

The second (meth)acrylic adhesive layer 120 may have lower Young's modulus than the first (meth)acrylic adhesive layer 110. Specifically, the second (meth)acrylic adhesive layer 120 may have a Young's modulus of about 250 MPa or less, specifically about 0.01 MPa to about 250 MPa, for example, about 0.01 MPa, about 0.05 MPa, about 0.1 MPa, about 0.5 MPa, about 1 MPa, about 10 MPa, about 20 MPa, about 30 MPa, about 40 MPa, about 50 MPa, about 60 MPa, about 70 MPa, about 80 MPa, about 90 MPa, about 100 MPa, about 110 MPa, about 120 MPa, about 130 MPa, about 140 MPa, about 150 MPa, about 160 MPa, about 170 MPa, about 180 MPa, about 190 MPa, about 200 MPa, about 210 MPa, or about 220 MPa. Within this range, the adhesive film can have peel strength in the above range and can exhibit good reliability and bendability.

The second (meth)acrylic adhesive layer 120 may have a thickness about 10% to about 90% of the total thickness of the adhesive layer 100, specifically about 15% to about 60%. Within this range, the adhesive film can easily secure peel strength in the above range. The second (meth)acrylic adhesive layer 120 may have a thickness of about 1 μm to about 100 μm, specifically about 5 μm to about 45 μm. Within this thickness range, the second (meth)acrylic layer can be used in the adhesive film and can easily secure peel strength of the adhesive film within the above range.

Next, a composition for the second (meth)acrylic adhesive layer according to one embodiment will be described.

The composition for the second (meth)acrylic adhesive layer may include a (meth)acrylic resin having a glass transition temperature of about 0° C. or less and a curing agent. Within this range of glass transition temperature, the adhesive film can exhibit good reliability. The (meth)acrylic resin may have a glass transition temperature of about 0° C. or less, specifically about −100° C. to about −20° C., more specifically about −60° C. to about −20° C., for example, about −100° C., about −90° C., about −80° C., about −70° C., about −60° C., about −50° C., about −40° C., about −30° C., or about −20° C.

The alkyl group-containing (meth)acrylic monomer may include an unsubstituted $C_1$ to $C_{20}$ alkyl group-containing (meth)acrylic acid ester. Specifically, the alkyl group-containing (meth)acrylic monomer may include at least one selected from among ethyl(meth)acrylate, propyl(meth)acrylate, N-butyl (meth)acrylate, pentyl (meth)acrylate, and 2-ethylhexyl (meth)acrylate. These may be used alone or as a mixture thereof.

The hydroxyl group-containing (meth)acrylic monomer may include a $C_1$ to $C_{20}$ alkyl group-containing (meth)acrylic acid ester having at least one hydroxyl group. Specifically, the hydroxyl group-containing (meth)acrylic monomer may include at least one of 2-hydroxyethyl (meth)acrylate, 3-hydroxypropyl (meth)acrylate, and 4-hydroxybutyl (meth)acrylate. These may be used alone or as a mixture thereof.

The monomer mixture may include about 70 parts by weight to about 99 parts by weight of the alkyl group-containing (meth)acrylic monomer relative to 100 parts by weight of the composition in terms of solid content, for example, about 70 parts by weight, about 75 parts by weight, about 80 parts by weight, about 85 parts by weight, about 90 parts by weight, about 95 parts by weight, about 99 parts by weight, hydroxyl group-containing (meth)acrylic monomer about 1 part by weight to about 30 parts by weight, for example, about 1 part by weight, about 5 parts by weight, about 10 parts by weight, about 15 parts by weight, about 20 parts by weight, about 25 parts by weight, or about 30 parts by weight. Within this range, the adhesive film can exhibit good reliability. Here, "in terms of solid content" means the total amount of components excluding the amount of the solvent in the monomer mixture.

The (meth)acrylic resin may be prepared by a typical method. Specifically, the (meth)acrylic resin may be prepared by adding an initiator to the monomer mixture, followed by reaction at about 50° C. to about 100° C. The initiator may be 2,2'-azobisisobutyronitrile (AIBN), without being limited thereto. The initiator may be present in an amount of about 0.01 parts by weight to about 1 part by weight relative to 100 parts by weight of the monomer mixture. Within this range, the (meth)acrylic resin can be produced in high yield.

In addition to the alkyl group-containing (meth)acrylic monomer and the hydroxyl group-containing (meth)acrylic monomer, the (meth)acrylic resin may further include at least one of an alicyclic group-containing (meth)acrylic monomer, an aromatic group-containing (meth)acrylic monomer, and a carboxylic acid group-containing monomer, which are well known in the art.

The (meth)acrylic resin may have a weight average molecular weight (Mw) of about 2,000,000 or less, specifically about 600,000 to about 1200,000, for example, about 600,000, about 650,000, about 700,000, about 750,000, about 800,000, about 850,000, about 900,000, about 950,000, about 1,000,000, about 1,050,000, about 1,100,000, about 1,150,000, about 1,200,000, about 1,250,000, about 1,300,000, about 1,350,000, about 1,400,000, about 1,450,000, about 1,500,000, about 1,550,000, about 1,600,000, about 1,650,000, about 1,700,000, about 1,750,000, about 1,800,000, about 1,850,000, about 1,900,000, about 1,950,000, or about 2,000,000. Within this range, the adhesive film can exhibit good reliability.

The curing agent serves to cure the (meth)acrylic copolymer and may include typical isocyanate, epoxy, imine, metal chelate, and carbodiimide curing agents. Specifically, the curing agent may include at least one of hexamethylene diisocyanate, toluene diisocyanate (TDI), xylene diisocyanate, isophorone diisocyanate, naphthalene diisocyanate, and a trimethylolpropane-modified toluene diisocyanate adduct.

The curing agent may be present in an amount of about 0.01 parts by weight to about 50 parts by weight, specifically about 0.1 parts by weight to about 20 parts by weight, relative to 100 parts by weight of the (meth)acrylic resin. Within this range, the adhesive layer can secure sufficient modulus.

Next, a composition for the second (meth)acrylic adhesive layer according to another embodiment will be described.

The composition for the second (meth)acrylic adhesive layer according to this embodiment may include the (meth)acrylic resin and the curing agent of the composition for the first (meth)acrylic adhesive layer described above. Here, the curing agent may be present in an amount of about 80 parts by weight to about 200 parts by weight relative to 100 parts by weight of the (meth)acrylic resin, specifically about 100 parts by weight to about 150 parts by weight, for example, about 80 parts by weight, about 85 parts by weight, about 90 parts by weight, about 95 parts by weight, about 100 parts by weight, about 105 parts by weight, about 110 parts by weight, about 115 parts by weight, about 120 parts by weight, about 125 parts by weight, about 130 parts by weight, about 135 parts by weight, about 140 parts by weight, about 145 parts by weight, about 150 parts by weight, about 155 parts by weight, about 160 parts by weight, about 165 parts by weight, about 170 parts by weight, about 175 parts by weight, about 180 parts by weight, about 185 parts by weight, about 190 parts by weight, about 195 parts by weight, or about 200 parts by weight. Within this range, the adhesive film can secure good reliability and sufficient modulus.

The composition for the second (meth)acrylic adhesive layer may further include the silane coupling agent, the additives, the crosslinking catalyst, and the solvent described above.

FIG. 1 shows the adhesive film in which each of the first (meth)acrylic adhesive layer 110 and the second (meth)acrylic adhesive layer 120 is composed of a single adhesive layer. However, it should be understood that each of the first (meth)acrylic adhesive layer 110 and the second (meth)acrylic adhesive layer 120 may be composed of multiple adhesive layers so long as the adhesive film can secure Young's modulus and peel strength in the ranges described above.

Further, FIG. 1 shows the adhesive film in which the first (meth)acrylic adhesive layer 110 is directly formed on the second (meth)acrylic adhesive layer 120. Herein, the expression "directly formed on" means that there is no adhesive layer or bonding layer interposed between the first (meth)acrylic adhesive layer 110 and the second (meth)acrylic adhesive layer 120.

Figure 2:
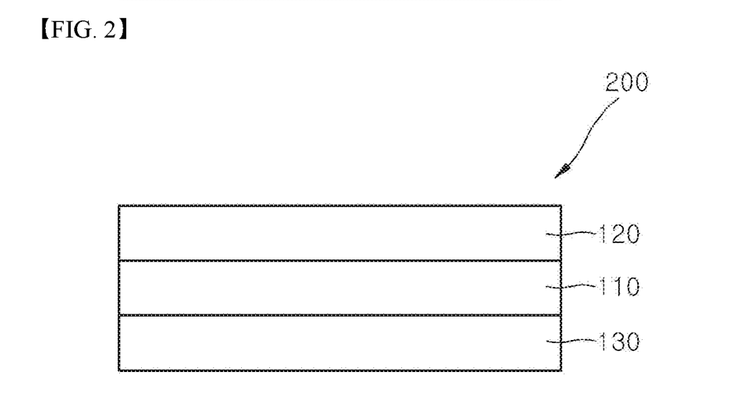
FIG. 2 is a sectional view of an adhesive film according to another embodiment of the present invention.

Next, an adhesive film according to another embodiment will be described with reference to FIG. 2. FIG. 2 is a sectional view of an adhesive film according to another embodiment of the present invention.

Referring to FIG. 2, an adhesive film 200 according to this embodiment includes a first (meth)acrylic adhesive layer 110, a second (meth)acrylic adhesive layer 120, and a third (meth)acrylic adhesive layer 130. The adhesive film according to this embodiment is substantially the same as the adhesive film according to the above embodiment except that the third (meth)acrylic adhesive layer 130 is further formed on one surface of the first (meth)acrylic adhesive layer 110. Thus, the following description will focus on the third (meth)acrylic adhesive layer 130.

The third (meth)acrylic adhesive layer 130 is formed on the first (meth)acrylic adhesive layer 110 such that the adhesive film 200 can secure sufficient peel strength at both surfaces thereof. Specifically, the adhesive film 200 may have a peel strength of about 1.0 N/mm or higher with respect to a polyethylene terephthalate (PET) film, specifically about 1.0 N/mm to about 20 N/mm, more specifically about 1.0 N/mm to about 10 N/mm, as measured on the other surface thereof, that is, on the third (meth)acrylic adhesive layer 130. Within this range, the adhesive film allows efficient adhesion of one optical element to another optical element therethrough.

The third (meth)acrylic adhesive layer 130 may have lower Young's modulus than the first (meth)acrylic adhesive layer 110. Accordingly, the adhesive film 200 can secure peel strength in the above range. Specifically, the ratio of Young's modulus of the first (meth)acrylic adhesive layer to Young's modulus of the third (meth)acrylic adhesive layer (Young's modulus of the first (meth)acrylic adhesive layer/Young's modulus of the third (meth)acrylic adhesive layer) may be about 5 or higher, specifically about 5 to about 11,000. Within this range, the adhesive film can secure pencil hardness of an optical element on the adhesive film and peel strength in the above ranges at the same time. Specifically, the third (meth)acrylic adhesive layer 130 may have a modulus of about 500 MPa or less, specifically about 0.01 MPa to about 500 MPa, for example, about 0.01 MPa, about 0.05 MPa, about 0.1 MPa, about 0.5 MPa, about 1 MPa, about 10 MPa, about 20 MPa, about 30 MPa, about 40 MPa, about 50 MPa, about 60 MPa, about 70 MPa, about 80 MPa, about 90 MPa, about 100 MPa, about 110 MPa, about 120 MPa, about 130 MPa, about 140 MPa, about 150 MPa, about 160 MPa, about 170 MPa, about 180 MPa, about 190 MPa, or about 200 MPa. Within this range, the adhesive film can secure peel strength in the above range and can have good reliability.

The third (meth)acrylic adhesive layer 130 may have a thickness about 10% to about 90% of the total thickness of the adhesive film 200, specifically about 15% to about 60%, for example, about 15%, about 20%, about 25%, about 30%, about 35%, about 40%, about 45%, about 50%, about 55%, or about 60%. Within this range, the adhesive film can easily secure pencil hardness of an optical element on the adhesive film in the above range. The third (meth)acrylic adhesive layer 130 may have a thickness of about 1 μm to about 30 μm, specifically about 5 μm to about 30 μm. Within this thickness range, the third (meth)acrylic adhesive layer 130 can be used in the adhesive film and can easily secure pencil hardness of an optical element on the adhesive film in the above range.

The third (meth)acrylic adhesive layer may be formed of a composition for the third (meth)acrylic adhesive layer. Hereinafter, the composition for the third (meth)acrylic adhesive layer will be described. The composition for the third (meth)acrylic adhesive layer includes a (meth)acrylic resin and a curing agent.

The third (meth)acrylic adhesive layer may be formed of the same or different composition than the composition for the second (meth)acrylic adhesive layer.

FIG. 2 shows the adhesive film, the third (meth)acrylic adhesive layer 130 of which is composed of a single adhesive layer. However, it should be understood that the third (meth)acrylic adhesive layer 130 may be composed of multiple adhesive layers so long as the adhesive film can secure Young's modulus and peel strength in the ranges described above, like the first (meth)acrylic adhesive layer and/or the second (meth)acrylic adhesive layer.

Further, FIG. 2 shows the adhesive film in which the first (meth)acrylic adhesive layer 110 is directly formed on the third (meth)acrylic adhesive layer 130. Herein, the expression "directly formed on" means that there is no adhesive layer or bonding layer interposed between the first (meth)acrylic adhesive layer 110 and the third (meth)acrylic adhesive layer 130. However, it should be understood that other adhesive layers, bonding layers or films may be interposed between the first (meth)acrylic adhesive layer 110 and the third (meth)acrylic adhesive layer 130 so long as the adhesive film can secure Young's modulus and peel strength in the ranges described above.

An optical member according to the present invention may include the adhesive film according to the embodiments of the present invention.

Figure 3:
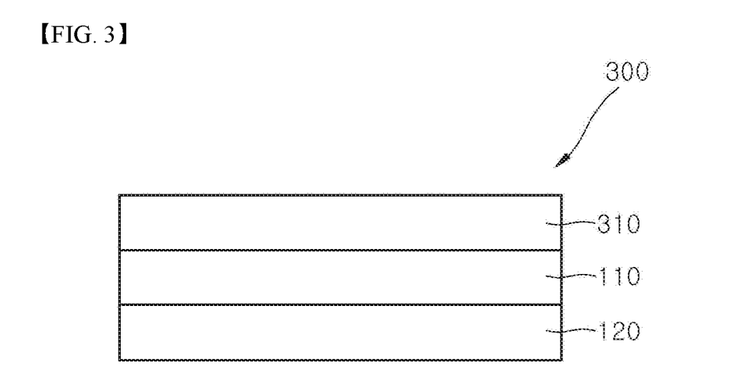
FIG. 3 is a sectional view of an optical member according to one embodiment of the present invention.

Next, an optical member according to one embodiment of the present invention will be described with reference to FIG. 3. FIG. 3 is a sectional view of an optical member according to one embodiment of the present invention.

Referring to FIG. 3, an optical member 300 according to one embodiment includes an optical element 310 and an adhesive film. In this embodiment, the adhesive film may include the adhesive film 100 according to the embodiment of the invention. The first (meth)acrylic adhesive layer 110 is directly formed on the optical element 310.

The optical member 300 includes the adhesive film, whereby pencil hardness of the optical element on the adhesive film can be about HB or higher, specifically about HB to about 9H. Within this range, the optical member can be sufficiently used on an optical display, particularly at the outermost side thereof.

The optical element 310 may have a pencil hardness of about HB or higher, specifically about HB to about 9H. Within this range of pencil hardness, the optical element can be used in an optical display and can secure sufficient pencil hardness when mounted on the adhesive film.

The optical element 310 may be a non-flexible member or a flexible member to be applied to a flexible display. The optical element 310 may include an optical film, a polarizer, a polarizing plate, a window film, or a transparent electrode film, which may be used alone or as a combined stack thereof.

The optical film may include an optically transparent optical film typically used in the art. Specifically, the optical film may include at least one of cyclic polyolefin resins including amorphous cyclic olefin polymer (COP), poly(meth)acrylate resins, polycarbonate resins, polyester resins including polyethylene terephthalate (PET), cellulose ester resins including triacetylcellulose (TAC), polyether sulfone resins, polysulfone resins, polyamide resins, polyimide resins, non-cyclic polyolefin resins, polyarylate resins, polyvinyl alcohol resins, polyvinyl chloride resins, and polyvinylidene chloride resins. Specifically, the optical film may include a PET film.

The polarizer can realize polarization of internal light or prevent reflection of external light to realize a display, or can increase contrast of the display. The polarizer may include a polyvinyl alcohol-based polarizer obtained by dyeing a polyvinyl alcohol film with iodine, or a polyene-based polarizer.

The polarizing plate may include a polarizer and a protective film formed on one or both surfaces of the polarizer. Alternatively, the polarizing plate may include a polarizer and a protective coating layer formed on one or both surfaces of the polarizer. As the polarizer, the protective film and the protective coating layer, a typical polarizer, a typical protective film and a typical protective coating layer known in the art may be used.

The window film may be disposed on the outermost side of an optical display to protect the optical display. The window film may include a base layer and a window coating layer. The base layer serves to support the window film and may include a flexible film formed of at least one selected from among a polyester resin including polyethylene terephthalate, polyethylene naphthalate, polybutylene terephthalate, polybutylene naphthalate, and the like, polycarbonate resins, polyamide resins, polyimide resins, polystyrene resins, and poly(meth)acrylate resins including poly(methyl methacrylate). The window coating layer is formed on the base layer to be placed at the outermost side of the flexible display and may be a flexible coating layer. For example, the window coating layer may include a coating layer formed of a siloxane resin. In other embodiments, the window film may include a base layer, a window coating layer formed on one surface of the base layer, and a hardness enhancing coating layer formed on the other surface of the base layer. However, it should be understood that the window film composed only of the window coating layer without the base layer falls within the scope of the present invention.

The transparent electrode film generates electrical signals through detection of variation in capacitance when a human body or a conductor such as a stylus touches the transparent electrode film, and a display part may be driven by such electrical signals. The transparent electrode film is formed by patterning a flexible conductor, and may include first sensor electrodes and second sensor electrodes each formed between the first sensor electrodes and intersecting the first sensor electrodes. The transparent electrode film may include a conductive material such as metal nanowires, conductive polymers, and carbon nanotubes, without being limited thereto. The transparent electrode film may include a base layer and the patterned conductor, in which the base layer may include a polarizer.

In one embodiment, the optical member may have a stacked structure wherein the optical film, the first (meth) acrylic adhesive layer and the second (meth)acrylic adhesive layer are sequentially stacked one above another. In another embodiment, the optical member may have a stacked structure wherein the polarizing plate, the first (meth)acrylic adhesive layer and the second (meth)acrylic adhesive layer are sequentially stacked one above another. In a further embodiment, the optical member may have a stacked structure wherein the window film, the first (meth)acrylic adhesive layer and the second (meth)acrylic adhesive layer are sequentially stacked one above another.

Figure 4:
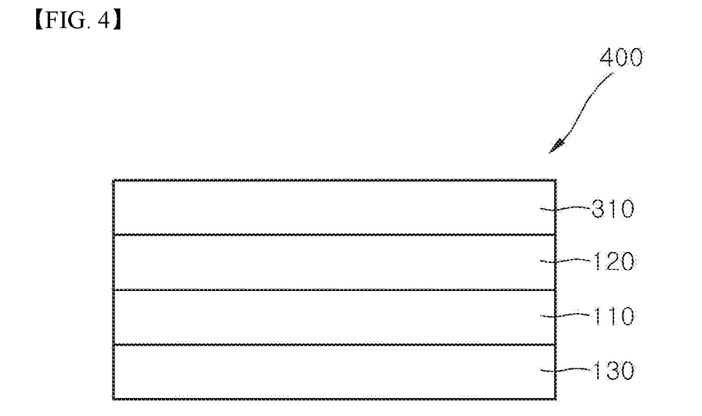
FIG. 4 is a sectional view of an optical member according to another embodiment of the present invention.

Next, an optical member according to another embodiment of the present invention will be described with reference to FIG. 4. FIG. 4 is a sectional view of an optical member according to another embodiment of the present invention.

Referring to FIG. 4, an optical member 400 according to this embodiment includes an optical element 310 and an adhesive film. In this embodiment, the adhesive film may include the adhesive film 200 according to the embodiment of the invention. The optical member according to this embodiment is substantially the same as the optical member according to the above embodiment except that the adhesive film 200 according to the other embodiment is used instead of the adhesive film 100 according to the one embodiment. Referring to FIG. 4, the second (meth)acrylic adhesive layer 120 may be attached to the optical element 310. Alternatively, the third (meth)acrylic adhesive layer 130 may be attached to the optical element 310.

In one embodiment, the optical member may have a stacked structure wherein the optical film, the second (meth) acrylic adhesive layer, the first (meth)acrylic adhesive layer and the third (meth)acrylic adhesive layer are sequentially stacked one above another. In another embodiment, the optical member may have a stacked structure wherein the polarizing plate, the second (meth)acrylic adhesive layer, the first (meth)acrylic adhesive layer and the third (meth)acrylic adhesive layer are sequentially stacked one above another. In a further embodiment, the optical member may have a stacked structure wherein the window film, the second (meth)acrylic adhesive layer, the first (meth)acrylic adhesive layer and the third (meth)acrylic adhesive layer are sequentially stacked one above another.

An optical display according to the present invention may include the adhesive film or the optical member according to the present invention. The optical display may include a flexible display. Specifically, the optical display may include a liquid crystal display or an organic light emitting diode display.

Figure 5:
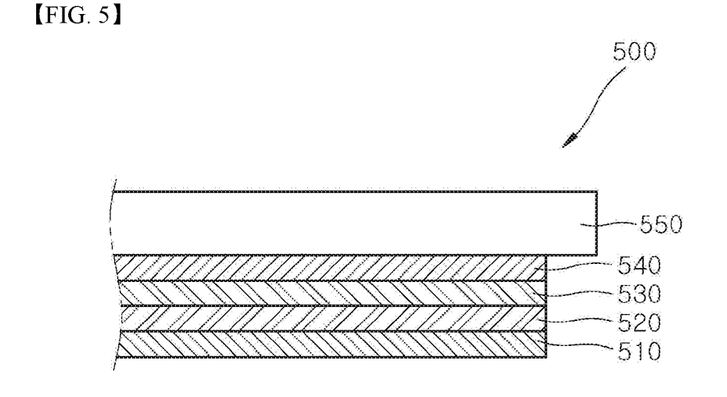
FIG. 5 is a sectional view of a flexible optical display according to one embodiment of the present invention.

Next, a flexible optical display according to one embodiment of the invention will be described with reference to FIG. 5. FIG. 5 is a sectional view of a flexible optical display according to one embodiment of the present invention.

Referring to FIG. 5, a flexible optical display 500 according to one embodiment includes a display panel 510, a polarizing plate 520, a touchscreen panel 530, an adhesive film 540, and a window film 550, in which the adhesive film 540 may include the adhesive film according to the embodiments of the invention.

Next, a method of manufacturing the adhesive film according to the one embodiment of the invention will be described.

The method of manufacturing the adhesive film according to the one embodiment of the invention may include preparing a coating for the first (meth)acrylic adhesive layer and a coating for the second (meth)acrylic adhesive layer, and combining the coating for the first (meth)acrylic adhesive layer with the coating for the second (meth)acrylic adhesive layer, followed by curing the combined coatings. The coating for the first (meth)acrylic adhesive layer may be prepared by coating the composition for the first (meth) acrylic adhesive layer onto a release film, followed by drying. The coating for the second (meth)acrylic adhesive layer may be prepared by coating the composition for the second (meth)acrylic adhesive layer onto a release film, followed by drying. Here, drying may be performed at about 50° C. to about 150° C. for about 1 minute to about 60 minutes. Curing may include room temperature curing, heat curing and/or photocuring, preferably room temperature curing or heat curing. Here, in order to prevent the coatings for the adhesive layers from being separated from each other, at least one interface between the coating for the first (meth)acrylic adhesive layer and the coating for the second (meth)acrylic adhesive layer may be subjected to corona or plasma treatment. Room temperature curing may be performed at about 20° C. to about 30° C. for about 1 minute to about 7 days and heat curing may be performed at about 35° C. to about 50° C. for about 1 minute to about 7 days, without being limited thereto.

Next, a method of manufacturing the adhesive film according to another embodiment will be described.

The method of manufacturing the adhesive film according to another embodiment may include forming a stacked structure of a sheet for the first (meth)acrylic adhesive layer and a sheet for the second (meth)acrylic adhesive layer by simultaneously coating the composition for the first (meth) acrylic adhesive layer and the composition for the second (meth)acrylic adhesive layer, followed by drying the coated compositions; and curing the sheet for the second (meth) acrylic adhesive layer and the sheet for the first (meth) acrylic adhesive layer.

Specifically, the composition for the first (meth)acrylic adhesive layer and the composition for the second (meth) acrylic adhesive layer are simultaneously coated onto a release film. Herein, "simultaneous coating" means that the composition for the first (meth)acrylic adhesive layer is immediately coated onto the composition for the second (meth)acrylic adhesive layer without drying the composition for the second (meth)acrylic adhesive layer coated onto the release film. A coating method is not limited to a particular one. For example, coating may be performed by bar coating or die coating. The compositions for the first and second (meth)acrylic adhesive layers may be simultaneously coated in a state that a coater containing the composition for the first (meth)acrylic adhesive layer is brought into contact with a coater containing the composition for the second (meth) acrylic adhesive layer. In this way, the composition for the first (meth)acrylic adhesive layer and the composition for the second (meth)acrylic adhesive layer are simultaneously coated onto the release film, thereby reducing manufacturing costs while providing high adhesion between the first (meth) acrylic adhesive layer and the second (meth)acrylic adhesive layer.

Thereafter, the stacked structure of the sheet for the first (meth)acrylic adhesive layer and the sheet for the second (meth)acrylic adhesive layer stacked on the release film may be cured by photocuring, room temperature curing and/or heat curing.

The method of manufacturing the adhesive film having a bilayer structure of the first (meth)acrylic adhesive layer and the second (meth)acrylic adhesive layer is described above. However, it should be understood that the adhesive film having a trilayer structure of the first (meth)acrylic adhesive layer, the second (meth)acrylic adhesive layer and the third (meth)acrylic adhesive layer may also be manufactured by the same method.

Next, the constitution and effects of the present invention will be described in detail with reference to some examples. However, it should be understood that these examples are provided for illustration only and are not to be construed in any way as limiting the present invention.

Details of components used in Examples and Comparative Examples are as follows:

(A) (Meth)acrylic adhesive resin (A1) (Meth)acrylic adhesive resin: A (meth)acrylic copolymer (weight average molecular weight: 1,000,000, glass transition temperature: −40° C.) comprising 99 wt % of butyl acrylate (BA) and 1 wt % of 2-hydroxyethyl acrylate (HEA)

(A2) (Meth)acrylic adhesive resin: HT-1335B (Manufacturer: Samhwa Paint Inc., Glass transition temperature: 50° C.)

(B) Curing agent (B1) Curing agent: AE700-100 (ASAHIKASEI CHEMICAL Co., allophanate hexamethylene diisocyanate-based curing agent)

(B2) Curing agent: Coronate L (TDI (toluene diisocyanate) adduct-based curing agent, Nippon Urethane Co., Ltd.)

Preparative Example 1

A mixture of 100 parts by weight of the (A2) (meth) acrylic adhesive resin and 15 parts by weight of the (B1) curing agent was diluted to a final solid concentration of 20 wt % in methylethylketone as a solvent, followed by stirring for 30 minutes, thereby preparing a composition for adhesive layers.

Preparative Example 2

A mixture of 100 parts by weight of the (A2) (meth) acrylic adhesive resin and 100 parts by weight of the (B1) curing agent was diluted to a final solid concentration of 20 wt % in methylethylketone as a solvent, followed by stirring for 30 minutes, thereby preparing a composition for adhesive layers.

Preparative Example 3

A mixture of 100 parts by weight of the (A1) (meth) acrylic adhesive resin and 0.4 parts by weight of the (B2) curing agent was diluted to a final solid concentration of 20 wt % in methylethylketone as a solvent, followed by stirring for 30 minutes, thereby preparing a composition for adhesive layers.

Preparative Example 4

A mixture of 100 parts by weight of the (A1) (meth) acrylic adhesive resin and 20 parts by weight of the (B2) curing agent was diluted to a final solid concentration of 20 wt % in methylethylketone as a solvent, followed by stirring for 30 minutes, thereby preparing a composition for adhesive layers.

Young's modulus of each of the compositions prepared in Preparative Examples 1 to 4 was measured at 25° C. in accordance with ASTM D882. Measurement results are shown in Table 1.

TABLE 1

|  |  | Preparative Example 1 | Preparative Example 2 | Preparative Example 3 | Preparative Example 4 |
|---|---|---|---|---|---|
| (Meth)acrylic resin (parts by weight) | (A1) (BA + HEA) | — | — | 100 | 100 |
|  | (A2) (HT-1335B) | 100 | 100 | — | — |

TABLE 1-continued

|  |  | Preparative Example 1 | Preparative Example 2 | Preparative Example 3 | Preparative Example 4 |
|---|---|---|---|---|---|
| Curing agent (parts by weight) | (B1) (AE700-100) | 15 | 100 | — | — |
|  | (B2) (Coronate L) | — | — | 0.4 | 20 |
| Modulus (MPa, @25° C.) |  | 980 | 220 | 0.09 | 0.78 |

Example 1

An adhesive film having a bilayer structure was prepared using the composition of Preparative Example 1 and the composition of Preparative Example 3. A monolayer coating for the first (meth)acrylic adhesive layer was prepared by coating the composition of Preparative Example 1 to a predetermined thickness on a polyethylene terephthalate (PET) release film, followed by heating the composition at 100° C. for 4 minutes to volatilize the solvent. A monolayer coating for the second (meth)acrylic adhesive layer was prepared by coating the composition of Preparative Example 3 to a predetermined thickness on a PET film, followed by heating the composition at 100° C. for 4 minutes to volatilize the solvent. The coatings for the adhesive layers were stacked to prepare an adhesive sheet having a bilayer structure. The adhesive sheet was cured at room temperature for 7 days, thereby preparing an adhesive film.

Example 2

A coating for the first (meth)acrylic adhesive layer, a coating for the second (meth)acrylic adhesive layer, and a coating for the third (meth)acrylic adhesive layer were prepared using the composition of Preparative Example 1, the composition of Preparative Example 4, and the composition of Preparative Example 3, each having a thickness as listed in Table 2, were prepared in the same manner as in Example 1. The coating for the Second (meth)acrylic adhesive layer, the coating for the first (meth)acrylic adhesive layer, and the coating for the third (meth)acrylic adhesive layer were sequentially stacked to prepare an adhesive film having a trilayer structure.

Example 3

A coating for the first (meth)acrylic adhesive layer, a coating for the second (meth)acrylic adhesive layer, and a coating for the third (meth)acrylic adhesive layer were prepared using the composition of Preparative Example 1, the composition of Preparative Example 3, and the composition of Preparative Example 4, each having a thickness as listed in Table 2, were prepared in the same manner as in Example 1. The coating (second (meth)acrylic adhesive layer) prepared using the composition of Preparative Example 3, the coating (first (meth)acrylic adhesive layer) prepared using the composition of Preparative Example 1, and the coatings (third (meth)acrylic adhesive layer) including the coating prepared using the composition of Preparative Example 4 and the coating prepared using the composition of Preparative Example 3 were sequentially stacked to prepare an adhesive film having a four-layer structure.

Examples 4 and 5

An adhesive film having a four-layer structure was prepared by the same method as in Example 3 except that the kind of composition for adhesive layers and the thickness of each layer were changed as listed in Table 2.

Comparative Example 1

An adhesive film having a monolayer structure and a thickness as listed in Table 3 was prepared by the same method as in Example 1 by coating the composition of Preparative Example 1 to a predetermined thickness on a PET film, followed by heating the composition at 100° C. for 4 minutes to volatilize the solvent.

Comparative Examples 2 to 4

An adhesive film having a monolayer structure was prepared by the same method as in Comparative Example 1 except that the composition for adhesive layers was changed as listed in Table 3.

The adhesive films prepared in Examples and Comparative Examples were evaluated as to the properties of Tables 2 and 3 and evaluation results are shown in Tables 2 and 3.

(1) Young's modulus: Young's modulus of each of the adhesive films was measured by a stress-strain testing method in accordance with ASTM D882. A specimen was obtained by cutting the adhesive film (thickness: 50 μm) to a size of 5 mm×200 mm (width×length). With both ends of the specimen secured to jigs of a Young's modulus tester, Young's modulus of the specimen was measured under the following conditions. Conditions for measurement of Young's modulus were as follows.

<Conditions for Measurement of Young's Modulus>
Measurement instrument: UTM (Universal Testing Machine)
Model: Texture analyzer, Stable Micro Systems Co., Ltd.
Measurement conditions: Load cell: 300 N, tensile rate: 0.1 mm/sec, temperature: 25° C.

(2) Peel strength: Peel strength of each adhesive film was measured in accordance with ASTM D3330. Specifically, a 50 μm thick adhesive film was cut to a size of 25 mm×100 mm (width×length) and attached to a polyethylene terephthalate (PET) film to prepare a sample, followed measuring peel strength (N/mm) of the sample under conditions of 25° C., 180°, and 300 mm/min. Peel strength was measured on the surface of the second (meth)acrylic adhesive layer of the adhesive film.

(3) Pencil hardness: Pencil hardness was measured in accordance with ASTM D3360. Pencil hardness of an optical element on an adhesive film was measured using a pencil hardness tester (CORE TECH, total solution for laboratory) on a surface of the optical element of a stacked structure of the adhesive film and the optical element disposed on a glass plate such that the optical element is placed at the outermost side. As the optical element, a PET film (thickness: 100 μm, Toyobo, A4300) or a polyimide film (thickness: 25 μm, DuPont, Kapton 100HN) was used. For measurement of pencil hardness, pencils of H to 9H, F, HB, and B to 6B (Mitsubishi Co., Ltd.) were used. Specifically, pencil hardness was measured under conditions of a scratch angle (angle between the pencil and the optical element) of 45°, a scratch speed of 0.5 mm/sec and a pencil scale of 5.0 mm under a load of 250 g. When the optical element had one or more scratches after being tested 5 times using a certain pencil, pencil hardness was measured again using another pencil having one-level lower pencil hardness than the previous pencil, and the maximum value of pencil hardness allowing no scratch to be observed all five times on the optical element was taken as pencil hardness of the optical element.

Pencil hardness of an optical element was measured in accordance with ASTM D3360 by the same method as the method of measuring pencil hardness of an optical element on an adhesive film except that pencil hardness was measured on the optical element without the adhesive film.

(4) Impact resistance: A trilayer specimen (length×width, 10 cm×10 cm) was prepared by sequentially stacking a PET film (thickness: 100 μm, Toyobo, A4300) as an optical element, each of the adhesive films of Examples and Comparative Examples and a glass plate, and a weight of a steel ball (SUS) by which the PET film started to break was measured when steel balls (SUS) having different weights were sequentially dropped onto the PET film of the specimen from a height of 20 cm from the PET film. Impact resistance was evaluated based on the weight of the steel ball by which the PET film started to break. A steel ball weight of 28 g or more causing breakage of the PET film was evaluated as ○, a steel ball weight of 24 g to less than 28 g causing breakage of the PET film was evaluated as Δ, and a steel ball weight of less than 24 g causing breakage of the PET film was evaluated as x.

(5) Bendability: A trilayer specimen (length×width, 60 cm×40 cm) was prepared by sequentially stacking a PET film (thickness: 100 μm, Toyobo, A4300) as an optical element, each of the adhesive films of Examples and Comparative Examples and a PET film (thickness: 100 μm, Toyobo, A4300), and bendability was evaluated on the specimen in accordance with IEC-62715. With the specimen mounted on a rolling type bendability tester (Yuasa, DLDMLH-4U) such that a bent portion of the specimen was placed in the longitudinal direction, a cycle of bending the specimen was repeated under conditions of a bent radius of 5 mm and a bending temperature of 25° C. at a bending speed of 30 cycles per minute. Bendability was evaluated based on the maximum number of bending cycles at which bubble generation, slight lifting, or delamination between the adhesive film and the PET film did not occur. A specimen allowing 100,000 or more cycles of bending was evaluated as ○, a specimen allowing 50,000 to less than 100,000 cycles of bending was evaluated as Δ, and a specimen allowing less than 50,000 cycles of bending was evaluated as x.

(6) Reliability: a trilayer specimen (length×width, 60 cm×40 cm) was prepared by sequentially stacking a PET film (thickness: 100 μm, Toyobo, A4300) as an optical element, each of the adhesive films of Examples and Comparative Examples and a PET film (thickness: 100 μm, Toyobo, A4300). Then, the specimen was bent under conditions of a bent radius of 3 mm and at 60° C. and 90% RH (high temperature and high humidity), or at 85° C. (high temperature), and was left for 250 hours. Thereafter, the bent specimen was left at 25° C. for 1 hour. A specimen suffering no slight lifting, bubble generation or delamination of the adhesive layer was evaluated as ○, a specimen suffering slight bubble generation or delamination was evaluated as Δ, and a specimen suffering severe bubble generation or delamination was evaluated as x.

TABLE 2

| | | Example | | | | |
|---|---|---|---|---|---|---|
| | | 1 | 2 | 3 | 4 | 5 |
| First (meth)acrylic adhesive layer | Composition | Preparative Example 1 | Preparative Example 1 | Preparative Example 1 | Preparative Example 1 | Preparative Example 1 |
| | Thickness (μm) | 20 | 20 | 10 | 10 | 10 |
| Second (meth)acrylic adhesive layer | Composition | Preparative Example 3 | Preparative Example 4 | Preparative Example 3 | Preparative Example 4 | Preparative Example 2 |
| | Thickness (μm) | 30 | 20 | 10 | 10 | 10 |
| Third (meth)acrylic adhesive layer | Composition | — | Preparative Example 3 | Preparative Example 4 | Preparative Example 4 | Preparative Example 4 |
| | Thickness (μm) | — | 10 | 10 | 10 | 10 |
| | Composition | — | — | Preparative Example 3 | Preparative Example 3 | Preparative Example 3 |
| | Thickness (μm) | — | — | 20 | 20 | 20 |
| Young's modulus(MPa) | | 480 | 370 | 210 | 204 | 189 |
| Peel strength (N/mm) | | 3.4 | 2.2 | 1.8 | 1.5 | 1.2 |
| PET film | Pencil hardness | H | H | H | H | H |
| | Pencil hardness on adhesive film | H | H | HB | HB | HB |
| Polyimide film | Pencil hardness | 2H | 2H | 2H | 2H | 2H |
| | Pencil hardness on adhesive film | 2H | 2H | H | H | H |
| Impact resistance | | ○ | ○ | ○ | ○ | ○ |
| Bendability | | ○ | ○ | ○ | ○ | ○ |
| Reliability | High Temperature | ○ | ○ | ○ | ○ | ○ |
| | High Temperature and high humidity | ○ | ○ | ○ | ○ | ○ |

TABLE 3

|  |  | Comparative Example | | | |
|---|---|---|---|---|---|
|  |  | 1 | 2 | 3 | 4 |
| Adhesive film | Composition | Preparative Example 1 | Preparative Example 2 | Preparative Example 3 | Preparative Example 4 |
|  | Thickness (μm) | 50 | 50 | 50 | 50 |
| Young's modulus (MPa) |  | 980 | 220 | 0.09 | 0.78 |
| Peel strength (N/mm) |  | 0.04 | 0.12 | 5.2 | 1.4 |
| PET film | Pencil hardness | H | H | H | H |
|  | Pencil hardness on adhesive film | 3H | 2H | 6B | 3B |
| Polyimide film | Pencil hardness | 2H | 2H | 2H | 2H |
|  | Pencil hardness on adhesive film | 3H | 2H | 2B | B |
| Impact resistance |  | x | Δ | ○ | Δ |
| Bendability |  | x | x | ○ | ○ |
| Reliability | High temperature | Δ | ○ | ○ | ○ |
|  | High temperature and high humidity | Δ | ○ | ○ | ○ |

As shown in Table 2, the adhesive films according to the present invention could minimize deterioration in pencil hardness and could secure a sufficient pencil hardness of HB or higher even when a PET film or a polyimide film was stacked thereon. In addition, the adhesive films according to the present invention had good impact resistance and did not suffer from bubble generation, delamination or slight lifting under high temperature or high temperature/humidity conditions to secure good reliability when adhesive layers having different moduli were stacked one above another. In addition, the adhesive films according to the present invention had good bendability and thus could be sufficiently used in a flexible display.

On the contrary, from Table 3, it could be seen that hardness of the adhesive films composed of a single layer compromised impact resistance and bendability thereof. That is, even when the adhesive films had good hardness, these adhesive films had insufficient impact resistance and bendability.

It should be understood that various modifications, changes, alterations, and equivalent embodiments can be made by those skilled in the art without departing from the spirit and scope of the present invention.

The invention claimed is:

1. An adhesive film comprising at least two (meth)acrylic adhesive layers comprising a first (meth)acrylic adhesive layer and a second (meth)acrylic adhesive layer,
   the adhesive film having a Young's modulus of about 100 MPa to about 1,000 MPa,
   wherein the second (meth)acrylic adhesive layer has a peel strength of about 1.0 N/mm or more with respect to a polyethylene terephthalate (PET) film,
   wherein the first (meth)acrylic adhesive layer is formed from a composition for the first (meth)acrylic adhesive layer, the composition comprising a (meth)acrylic resin having a glass transition temperature of about 30° C. to about 70° C., and
   wherein the adhesive film allows 100,000 cycles or more of bending without bubble generation in the adhesive film, as measured in accordance with IEC-62715 by repeating a cycle of bending a specimen under conditions of a bent radius of 5 mm and a bending temperature of 25° C. at a bending speed of 30 cycles per minute, the specimen being prepared by sequentially stacking a PET film with a thickness of 100 μm, the adhesive film with a thickness of 50 μm, and a PET film with a thickness of 100 μm to have a three-layer structure.

2. The adhesive film according to claim 1, wherein the first (meth)acrylic adhesive layer has greater modulus than the second (meth)acrylic adhesive layer.

3. The adhesive film according to claim 1, wherein the first (meth)acrylic adhesive layer has a thickness about 15% to about 60% of a total thickness of the adhesive film.

4. The adhesive film according to claim 1, wherein the first (meth)acrylic adhesive layer is formed by coating the composition for the first (meth)acrylic adhesive layer, followed by curing.

5. The adhesive film according to claim 4, wherein the composition for the first (meth)acrylic adhesive layer comprises the (meth)acrylic resin and a curing agent, the (meth)acrylic resin having a weight average molecular weight of about 1,000,000 or less.

6. The adhesive film according to claim 5, wherein the curing agent comprises a polyisocyanate-based curing agent modified with an allophanate group.

7. The adhesive film according to claim 5, wherein the curing agent is present in an amount of about 15 parts by weight to about 70 parts by weight relative to 100 parts by weight of the (meth)acrylic resin.

8. The adhesive film according to claim 1, wherein the second (meth)acrylic adhesive layer has a thickness about 15% to about 60% of a total thickness of the adhesive film.

9. The adhesive film according to claim 1, wherein the second (meth)acrylic adhesive layer is formed of a composition for adhesive layers comprising a (meth)acrylic resin having a glass transition temperature of about −60° C. to about −20° C. and a curing agent.

10. The adhesive film according to claim 1, wherein the second (meth)acrylic adhesive layer is formed of a composition for adhesive layers comprising a (meth)acrylic resin and a curing agent, the (meth)acrylic resin of the composition for adhesive layers having a weight average molecular weight of about 1,000,000 or less and a glass transition temperature of about 25° C. to about 120° C.

11. The adhesive film according to claim 10, wherein the curing agent comprises a polyisocyanate-based curing agent modified with an allophanate group.

12. An optical member comprising the adhesive film according to claim 1 and an optical element on the adhesive film, wherein the optical element has a pencil hardness of about HB or higher on the adhesive film.

13. An optical member comprising an optical element and an adhesive film formed on at least one surface of the optical element,
wherein the adhesive film comprises the adhesive film according to claim 1.

14. The optical member according to claim 13, wherein the optical element comprises at least one of a window film, a polarizer, a polarizing plate, an optical film, and a transparent electrode film.

15. An optical display comprising the adhesive film according to claim 1.

16. An adhesive film comprising multiple (meth)acrylic adhesive layers in which a second (meth)acrylic adhesive layer, a first (meth)acrylic adhesive layer and a third (meth) acrylic adhesive layer are sequentially stacked one above another,
the adhesive film having a Young's modulus of about 100 MPa to about 1,000 MPa,
wherein the second (meth)acrylic adhesive layer or the third (meth)acrylic adhesive layer has a peel strength of about 1.0 N/mm or more with respect to a polyethylene terephthalate (PET) film,
wherein the first (meth)acrylic adhesive layer is formed from a composition for the first (meth)acrylic adhesive layer, the composition comprising a (meth)acrylic resin having a glass transition temperature of about 30° C. to about 70° C., and
wherein the adhesive film allows 100,000 cycles or more of bending without bubble generation in the adhesive film, as measured in accordance with IEC-62715 by repeating a cycle of bending a specimen under conditions of a bent radius of 5 mm and a bending temperature of 25° C. at a bending speed of 30 cycles per minute, the specimen being prepared by sequentially stacking a PET film with a thickness of 100 μm, the adhesive film with a thickness of 50 μm, and a PET film with a thickness of 100 μm to have a three-layer structure.

17. The adhesive film according to claim 16, wherein the first (meth)acrylic adhesive layer has a greater Young's modulus than the third (meth)acrylic adhesive layer.

18. The adhesive film according to claim 16, wherein the third (meth)acrylic adhesive layer is formed of the same composition as the second (meth)acrylic adhesive layer.

19. The adhesive film according to claim 16, wherein the third (meth)acrylic adhesive layer comprises two or more (meth)acrylic adhesive layers.

* * * * *